US008848652B2

(12) United States Patent
Noh (10) Patent No.: US 8,848,652 B2
(45) Date of Patent: Sep. 30, 2014

(54) METHOD AND MULTIMODE TERMINAL FOR MINIMIZING MUTE INTERVAL

(75) Inventor: Jeong-Min Noh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1282 days.

(21) Appl. No.: 11/645,960

(22) Filed: Dec. 27, 2006

(65) Prior Publication Data

US 2007/0147303 A1 Jun. 28, 2007

(30) Foreign Application Priority Data

Dec. 27, 2005 (KR) .......................... 10-2005-130839

(51) Int. Cl.
*H04W 4/00* (2009.01)
*H04W 36/00* (2009.01)
*H04M 1/00* (2006.01)

(52) U.S. Cl.
CPC ................................ *H04W 36/0055* (2013.01)
USPC ........ 370/331; 455/436; 455/439; 455/552.1; 370/330

(58) Field of Classification Search
CPC .. H04W 52/0274; H04W 36/00; H04W 88/06
USPC .......... 370/331, 324, 330; 455/436, 439, 442, 455/552.1
See application file for complete search history.

(56) References Cited

U.S. PATENT DOCUMENTS

| 6,424,638 B1 | 7/2002 | Ray et al. | |
| 2002/0021681 A1* | 2/2002 | Madour | 370/331 |
| 2002/0067707 A1* | 6/2002 | Morales et al. | 370/331 |
| 2004/0137903 A1 | 7/2004 | Park | |
| 2005/0073977 A1* | 4/2005 | Vanghi et al. | 370/335 |
| 2006/0056448 A1 | 3/2006 | Zaki et al. | |
| 2006/0187882 A1 | 8/2006 | Kwak et al. | |
| 2008/0049673 A1 | 2/2008 | Park et al. | |

FOREIGN PATENT DOCUMENTS

| JP | 2004-208136 | 7/2004 | |
| KR | 1020040049124 | 6/2004 | |
| KR | 1020040049125 | 6/2004 | |
| KR | 1020050077122 | 8/2005 | |
| KR | 1020060071299 | 6/2006 | |
| KR | 1020060092787 | 8/2006 | |
| WO | WO 2005/120109 A1 * | 12/2005 | ............... H04Q 7/38 |

* cited by examiner

*Primary Examiner* — Nizar Sivji
(74) *Attorney, Agent, or Firm* — The Farrell Law Firm, P.C.

(57) ABSTRACT

A method and a multimode terminal for minimizing a mute interval caused when call interruption occurs due to a handover between communication networks which provide communication services using different mobile communication technologies. In the method, communication network modems of the terminal supporting a multimode are interconnected through a one-to-one communication path, so that a voice path through the current communication network is maintained until the handover is completed. If a Handover Completion Message is received, switching to a voice path through a handover-target communication network modem can be performed through the communication path. Further, the modems are interconnected through the communication path, so that a modem switching procedure is not necessary and a handover processing procedure is simplified. Accordingly, handover processing time can also be reduced. In addition, time for switching the voice path is minimized, so that it is possible to considerably reduce a mute interval which inevitably occurs during a handover.

11 Claims, 5 Drawing Sheets

METHOD AND MULTIMODE TERMINAL FOR MINIMIZING MUTE INTERVAL

PRIORITY

This application claims priority to an application filed in the Korean Intellectual Property Office on Dec. 27, 2005 and assigned Ser. No. 2005-130839, the contents of which are incorporated herein by reference.

BACKGROUND OF THE INVENTION

1. Field of the Invention

The present invention generally relates to communications and, more particularly, to a method and a multimode terminal for minimizing a mute interval caused when call interruption occurs due to handover between communication networks which provide communication services by means of different mobile communication technologies.

2. Description of the Related Art

Currently, a mobile communication network is being developed from a 2G network, i.e. a Code Division Multiple Access (CDMA) network and a Global System for Mobile communication (GSM) network, to a 3G network, such as a Wideband CDMA (WCDMA) network. Further, since service areas using a 2G network have been widely distributed and have been completely equipped with basic facilities, service areas using a 3G network have increased while transiently using the basic facilities of such a 2G network. Accordingly, in such transient situations, a terminal designed to receive the specified service of the 3G network has been manufactured as a multimode terminal which also supports the existing 2G network.

Such a multimode terminal supports both an idle handover function, through which a WCDMA mode can be switched to a CDMA mode in an idle state, and vice versa, and a traffic handover function through which switching to a CDMA mode can be accomplished without communication interruption when the terminal enters a WCDMA shadow area during communication. Such functions are efficient in terms of using the CDMA network (2G network). However, since a handover must be accomplished between different modems within a short time, internal hardware and software of the terminal become complicated.

Since a handover between a WCDMA system and a CDMA system corresponds to a handover between different types of systems in which Radio Access Technologies (RAT) are different, the handover will be referred to as an inter-RAT handover. Further, since the handover corresponds to a handover between different types of systems, it corresponds to a hard handover in which voice interruption occurs when changing the systems, differently from a soft handover with no voice interruption. Therefore, a mute interval inevitably occurs in handover between communication networks which provide communication services by means of different mobile communication technologies. Reducing such a mute interval is an important goal of the inter-RAT handover technology.

Figure 1:
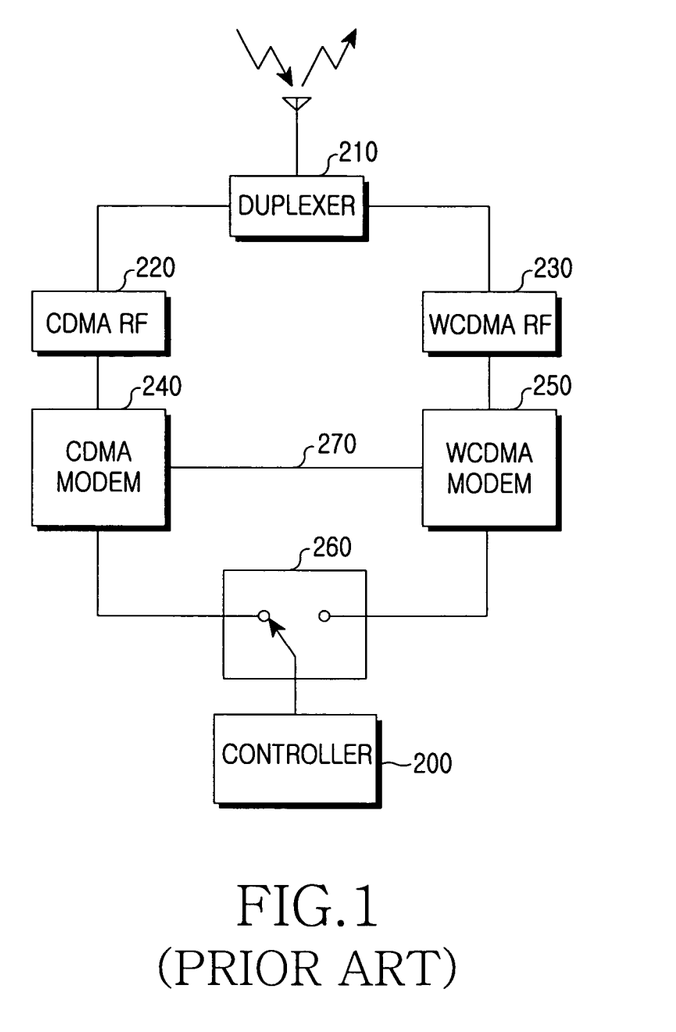
FIG. 1 is a block diagram illustrating the construction of a terminal which performs traffic handover according to the prior art.

FIG. 1 is a block diagram illustrating a terminal which performs a traffic handover according to the prior art.

When the terminal shown in FIG. 1 is located in a WCDMA network, a CDMA RF 220 and a CDMA modem 240 are temporarily powered off. However, since an antenna, a duplexer 210, a WCDMA RF 230 and a WCDMA modem 250 are powered on, the terminal operates in a WCDMA mode. Further, when the terminal is located in a CDMA network, the CDMA RF 220 and the CDMA modem 240 are powered on, but the antenna, the duplexer 210, the WCDMA RF 230 and the WCDMA modem 250 are temporarily powered off. Accordingly, the terminal operates in a CDMA mode.

Figure 2:
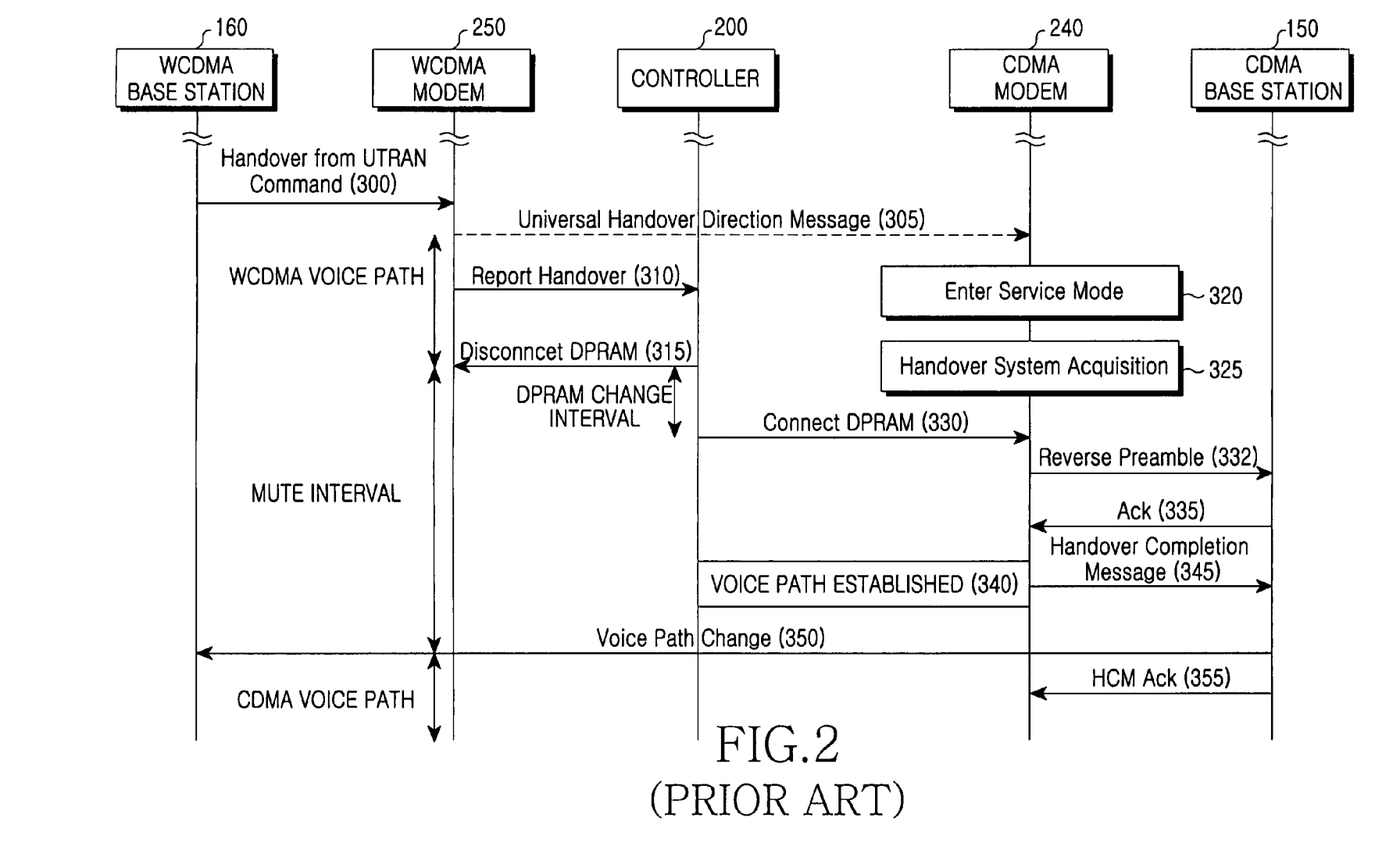
FIG. 2 is a ladder diagram illustrating an operation of a terminal which performs traffic handover to a CDMA network from a WCDMA network.

An operation of the terminal performing a traffic handover to a CDMA network from a WCDMA network will be described with reference to FIG. 2. Generally, if communication begins in a WCDMA mode, a controller 200 turns on the CDMA modem 240, and the CDMA modem 240 goes into a low power mode and waits to receive a message. Then, as the handover occurs, if the WCDMA modem 250 receives a handover from a Universal Mobile Telecommunications System Terrestrial Radio Access Network (UTRAN) command from a WCDMA base station in step 300, the WCDMA modem 250 communicates with the controller 200 and activates the CDMA modem 240. In step 305, the WCDMA modem 250 extracts a Universal Handover Direction Message (UHDM) from the received handover from the UTRAN command message, and transfers the extracted UHDM to the CDMA modem 240. If the UHDM is received from the WCDMA modem 250, the CDMA modem 240 enters a service mode in order to acquire a handover system in step 320, and performs acquisition of the handover system in step 325.

Separately from the operation of the CDMA modem 240 as described above, the WCDMA modem 250 transfers a handover report to the controller 200 in step 310. In step 315, the controller 200 transfers disconnect Dual-Port Random Access Memory signals, which disconnect a DPRAM, to the WCDMA modem 250. In step 330, the controller 200 transfers connect DPRAM signals, which connect the DPRAM, to the CDMA modem 240. In other words, a switching operation is performed, in which a path, through which the WCDMA modem 250 transfers received voice signals to the controller 200 through the DPRAM, is changed to the CDMA modem 240.

In order to perform the switching operation, the voice path of the WCDMA modem 250 is first blocked. From this point, there occurs a mute interval which a user experiences. After the voice path is blocked, the controller 200 releases the DPRAM connection of the WCDMA modem 250, i.e. the switch connection, and initializes the DPRAM connection of the CDMA modem 240. Since this corresponds to a change in a hardware path, when a DPRAM synchronization is made between the controller 200 and the CDMA modem 240 after a predetermined amount of time passes, it is possible to normally exchange data through the DPRAM. However, invalid data may be transmitted in the process of initializing the DPRAM. If the process of initializing the DPRAM connection fails, the handover processing ends in a failure and communication ends.

However, if the process of initializing the DPRAM connection ends successfully, the CDMA modem 240 changes the voice path to the CDMA, and waits to receive voice signals. This process is performed in parallel with a process in which the CDMA modem 240 processes the UHDM. Since the handover processing has not yet ended at this time point, the mute interval continues. Further, even when there occurs a problem in the course of processing the UHDM, the handover processing ends in a failure and communication ends.

Accordingly, only when the UHDM is processed and a Handover Completion Message (HCM) is transmitted in step 345 via steps 332 and 335, a voice path is established in step 340. In step 350, a voice path change is reported and voice signals are actually received through the CDMA modem 240. In step 355, the CDMA modem 240 receives an acknowledgment message for an HCM. In this way, a user can actually be allowed to hear the voice of a communication partner. For example, a time of about 0.9 seconds normally occurs before a user can actually be allowed to hear the voice of a communication partner after a mute interval in a traffic handover. This time is long enough for the user to detect mute.

As described above, since the handover is performed through the switching operation between the modems, the mute interval continues because it is possible to maintain the output of voice communication until the switching operation is completed. Therefore, a user must wait in the mute state until the switching operation is completed for the handover, and communication is connected. The user is therefore greatly inconvenienced.

SUMMARY OF THE INVENTION

Accordingly, the present invention has been made to solve the above-mentioned problems occurring in the prior art, and an object of the present invention is to provide a method and a multimode terminal for minimizing a mute interval caused when a call interruption occurs due to handover between communication networks which provide communication services using different mobile communication technologies.

In accordance with one aspect of the present invention, there is provided a method for minimizing a mute interval in a multimode terminal having a first modem and a second modem, which support different communication services, the method including starting a handover according to a UTRAN command received through a first communication network; determining if handover in the second modem has been completed through a communication path interconnecting the two modems while maintaining a voice path through the first modem if the handover starts; and switching the voice path through the first modem to a voice path through the second modem, thereby performing communication through a second communication network, when the handover has been completed.

In accordance with another aspect of the present invention, there is provided a multimode terminal for minimizing a mute interval, the multimode terminal having a first modem and a second modem, which support different communication services, the multimode terminal including the first modem for allowing the second modem to be in a traffic state according to a handover from a UTRAN command received through a first communication network, determining if handover in the second modem has been completed through a communication path interconnecting the two modems, and switching a current voice path to a voice path through the second modem when the handover has been completed; and the second modem for informing a second communication network of handover completion if the second modem is in the traffic state, and reporting the handover completion to the first modem if an acknowledgment message for the handover completion is received through the communication path.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein below with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention realizes a function for minimizing a mute interval caused when call interruption occurs due to handover between communication networks which provide communication services by means of different mobile communication technologies. To this end, in the present invention, communication network modems of a multimode terminal are interconnected through a one-to-one communication path, so that a voice path through the current communication network is maintained until handover is completed, and, if a Handover Completion Message (HCM) is received, switching to a voice path through a handover-target communication network modem can be performed through the communication path. As described above, the modems are interconnected through the one-to-one communication path, so that a modem switching procedure is not necessary and a handover processing procedure is simplified. Accordingly, handover processing time can also be reduced. In addition, time required for switching the voice path is minimized, so that it is possible to considerably reduce a mute interval which inevitably occurs in handover.

Figure 3:
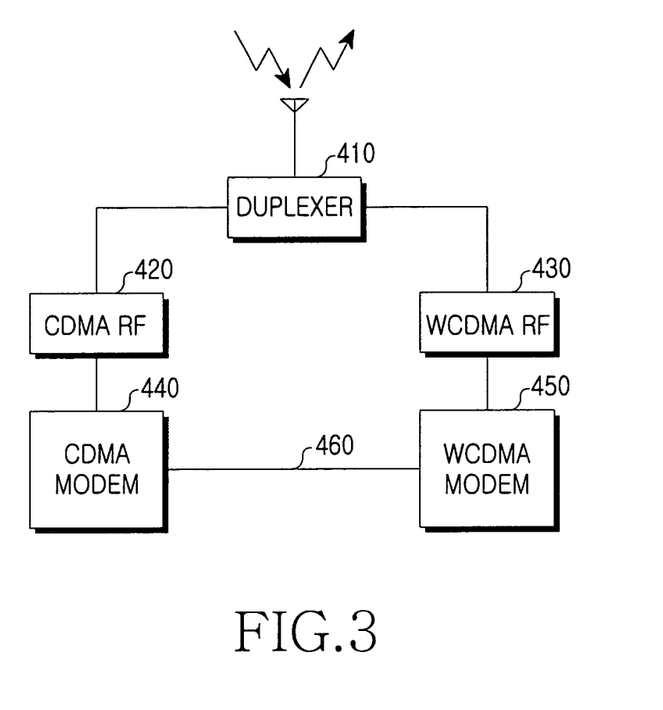
FIG. 3 is a block diagram illustrating the internal construction of a multimode terminal according to the present invention.

Hereinafter, the elements and operation of a multimode terminal having realized the function as described above will be described with reference to FIG. 3. FIG. 3 is a block diagram illustrating the internal construction of a multimode terminal according to the present invention. More particularly, FIG. 3 shows a CDMA and a WCDMA as an example of different mobile communication technologies, and describes an operation of the multimode terminal in handover from a WCDMA mode to a CDMA mode. The CDMA scheme can be replaced with a GSM scheme.

The terminal, which supports both a WCDMA mode and a CDMA mode, includes a WCDMA modem 450 and a CDMA modem 440 for respectively performing operations according to corresponding modes. The two modes 440 and 450 are interconnected through a communication path 460 for mutual communication.

The multimode terminal includes an antenna for transmitting and receiving WCDMA signals and CDMA signals, a duplexer 410 for separating the WCDMA signals from the CDMA signals transmitted/received through the antenna, a CDMA RF unit 420 and a WCDMA RF unit 430 for processing the WCDMA signals and the CDMA signals, respectively, and a CDMA modem 440 and a WCDMA modem 450 for processing the signals, which are transmitted/received through the CDMA RF unit 420 and the WCDMA RF unit 430, through corresponding processing modules, respectively. The WCDMA modem 450 and the CDMA modem 440 may be a modem chip constructed as a single chip or may also be a digital signal processor (DSP) within a chip.

The multimode terminal is equipped with a single antenna. When the terminal is located in a WCDMA network, the CDMA RF 420 and the CDMA modem 440 are temporarily powered off. However, since the antenna, the duplexer 410, the WCDMA RF 430 and the WCDMA modem 450 are powered on, the terminal operates in a WCDMA mode. Further, when the terminal is located in a CDMA network, the CDMA RF 420 and the CDMA modem 440 are powered on, but the antenna, the duplexer 410, the WCDMA RF 430 and the WCDMA modem 450 are temporarily powered off. Accordingly, the terminal operates in a CDMA mode. The WCDMA modem 450 functions as a processor for receiving data from the CDMA modem 440 through the communication path 460 and communicating with a user.

The WCDMA modem 450 transfers a handover from a UTRAN command, which is received from a WCDMA base station, to the CDMA modem 440 through the communication path 460 with the CDMA modem 440, and provides information necessary for performing handover. Since the WCDMA modem 450 can directly transfer a command to the CDMA modem 440, it is not necessary to provide a separate application processor (i.e. controller) for controlling the two modems 440 and 450. In this way, the controller is not provided in the terminal, so that user interfaces and device control units are installed in the modems 440 and 450, respectively. Accordingly, the WCDMA modem 450 and the CDMA modem 440 operate as a master and a slave, respectively. Consequently, according to the present invention, the WCDMA modem 450 and the CDMA modem 440 are always interconnected through a one-to-one communication path 460, so that a switching procedure between the modems is not necessary. As a result, handover processing time is reduced and the terminal is structurally simplified.

In order to minimize a mute interval, the two modems 440 and 450 are powered on during handover. The CDMA modem 440 acquires a network and then changes a voice path only after handover is successfully completed. In particular, when the WCDMA modem 450 receives a handover from UTRAN command from the WCDMA base station, the WCDMA modem 450 extracts a Universal Handover Direction Message (UHDM) from the received handover from UTRAN command. Then, the WCDMA modem 450 transfers the extracted UHDM to the CDMA modem 440 through the communication path 460, thereby turning on the CDMA modem 440.

Then, the powered CDMA modem 440 attempts to acquire an initial network. If the CDMA modem 440 succeeds in acquiring the initial network, the CDMA modem 440 processes the UHDM and goes into a traffic state. Further, the CDMA modem 440 transmits a reverse preamble message, which corresponds to a communication initialization stage with a corresponding base station, to a corresponding CDMA base station. If an acknowledgment message is received in response to the reverse preamble message, the CDMA modem 440 determines that the handover has been successfully completed. Accordingly, the CDMA modem 440 transmits an HCM to the CDMA base station. If the CDMA modem 440 transmits the HCM to the CDMA base station, vocoder switching occurs between a WCDMA system and a CDMA system. Therefore, from this time point, a mute interval actually occurs in the terminal.

Then, if an acknowledgment message for the HCM is received from the CDMA base station, the CDMA modem 440 transfers a report for the reception of the acknowledgment message to the WCDMA modem 450. Up to this point in time, the WCDMA modem 450 maintains a WCDMA voice path. Then, if the report for the handover completion is received from the CDMA modem 440, the WCDMA modem 450 performs switching to a CDMA voice path. That is, if the report for the handover completion is received from the CDMA modem 440, the WCDMA modem 450 operates a voice controller to switch the WCDMA voice path to the CDMA voice path. In this way, the voice path is switched, so that it is possible to receive voice signals. Accordingly, the CDMA modem 440 starts to receive voice signals, the mute interval ends, and thus normal communication is performed.

Figure 4:
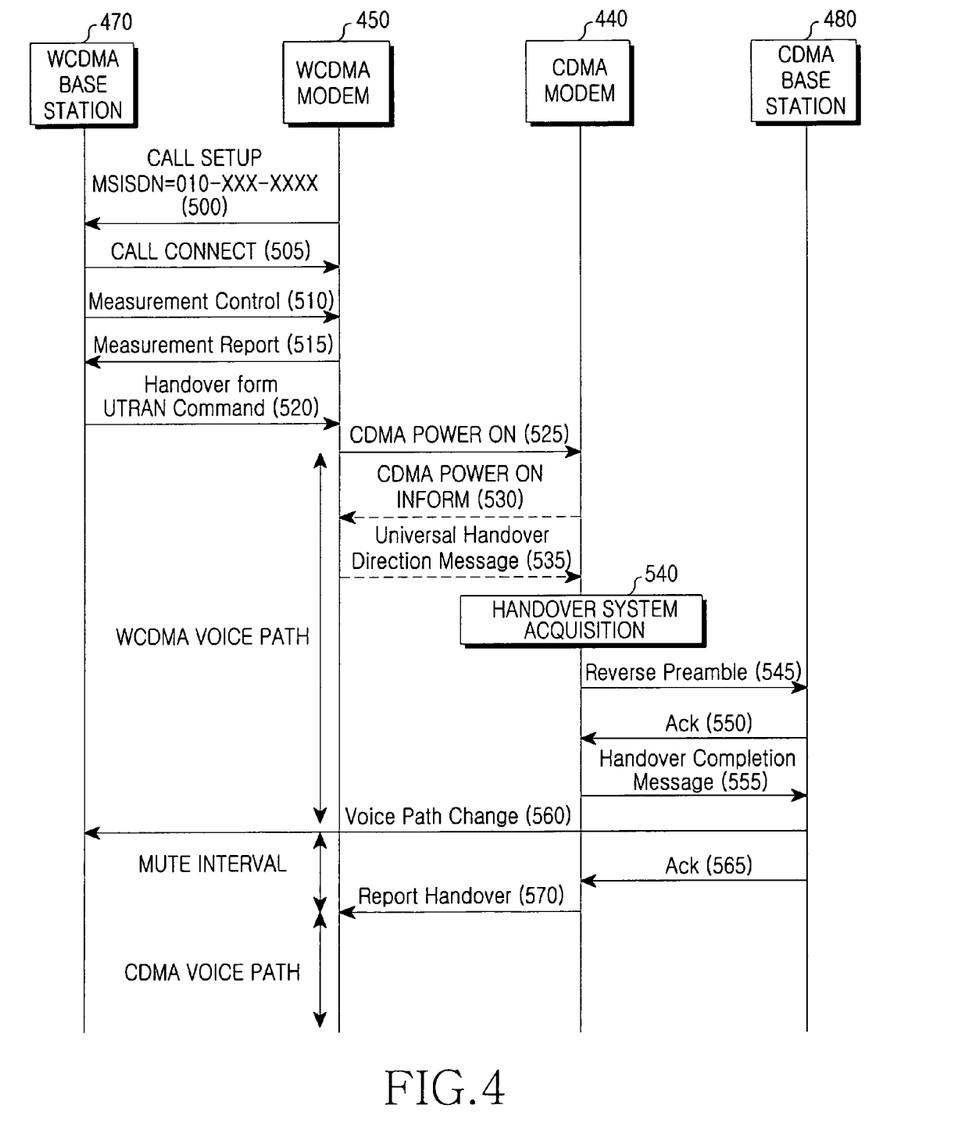
FIG. 4 is a ladder diagram illustrating a process for minimizing a mute interval in handover according to the present invention.

Hereinafter, a process for minimizing a mute interval in handover will be described with reference to FIG. 4. In FIG. 4, a multimode terminal enters a CDMA network from a WCDMA network.

If a user tries to make a call in a WCDMA mode, the WCDMA modem 450 transmits a call setup message including a calling number to a WCDMA base station 470, in step 500. If a call connect message is received in response to the transmission of the call setup message in step 505, a path for voice communication is established, so that communication through the WCDMA modem 450 is performed.

Separately from the operation in the WCDMA modem 450, the WCDMA base station 470 transmits a measurement control message to the WCDMA modem 450 in step 510, wherein the measurement control message includes a reference value for understanding a handover time point of the terminal. The reference value in the measurement control message represents a threshold value set by the WCDMA base station 470 in order to determine the handover time point of the terminal operating in the WCDMA mode. After receiving the measurement control message, the WCDMA modem 450 determines if the current wireless environment satisfies the reference value, in step 515. If the current wireless environment satisfies the reference value, the WCDMA modem 450 transmits a measurement report message to the WCDMA base station 470. In other words, the WCDMA modem 450 receives the measurement control message from the WCDMA base station 470, and continues to monitor the time point, at which handover conditions are satisfied, according to the command included in the measurement control message. The WCDMA modem 450 determines if the measured intensity of received signals satisfies the reference value included in the measurement control message. Accordingly, when it is determined that the measured intensity of received signals satisfies the reference value, the WCDMA modem 450 transmits the measurement report message to the WCDMA base station 470.

Then, the WCDMA base station 470 informs a WCDMA switching center of the reception of the measurement report message, and the WCDMA switching center acquires information on a CDMA base station, to which the terminal is to be handed over, through communication with a CDMA switching center. The WCDMA switching center requests the CDMA switching center to provide information on a base station to which the terminal must be handed over. In this way, if the WCDMA switching center acquires information on the corresponding base station, the WCDMA base station 470 generates a UHDM based on a CDMA scheme, inserts the UHDM into one field of a handover from UTRAN command message, and transmits the handover from UTRAN command message to the WCDMA modem 450, in step 520.

If the handover from UTRAN command message is received from the WCDMA base station 470, the WCDMA modem 450 turns on the CDMA modem 440 through the communication path 460 in step 525. Also, regarding handover, it is possible to turn on the CDMA modem 440 when communication starts. Since the WCDMA modem 450 is directly connected to the CDMA modem 440 through the communication path 460, the time point, at which the CDMA modem 440 is powered on, is not limited to this.

In step 530, the CDMA modem 440 communicates with the WCDMA modem 450, and transfers a CDMA power on inform message to the WCDMA modem 450. In step 535, the WCDMA modem 450 transfers the UHDM to the CDMA modem 440. In step 540, the CDMA modem 440 performs acquisition of a handover system in a conventional manner. If the CDMA modem 440 acquires the system, the CDMA modem 440 transfers a reverse preamble message for communication initialization with a CDMA base station 480 in step 545, and receives an acknowledgment message from the CDMA base station 480 in step 550. Then, the CDMA modem 440 determines that it has been ready to communicate with the CDMA base station 480, and transmits a handover completion message (HCM) to the CDMA base station 480 in step 555.

In the meantime, the vocoder switching between the WCDMA system and the CDMA system begins after the CDMA base station 480 receives the HCM from the CDMA modem 440. Accordingly, if the HCM is received from the CDMA modem 440 in step 555, a voice path change occurs between the WCDMA system and the CDMA system in step 560. As described above, when the voice path change begins, a mute interval temporarily occurs in the terminal. However, even when the mute interval temporarily occurs, an acknowledgment message for the HCM is received from the CDMA base station 480 in step 565 and a report for the acknowledgment message is transferred to the WCDMA modem 450 in step 570. Consequently, the mute interval corresponds to an interval which is short to the extent that a user cannot detect it.

Figure 5:
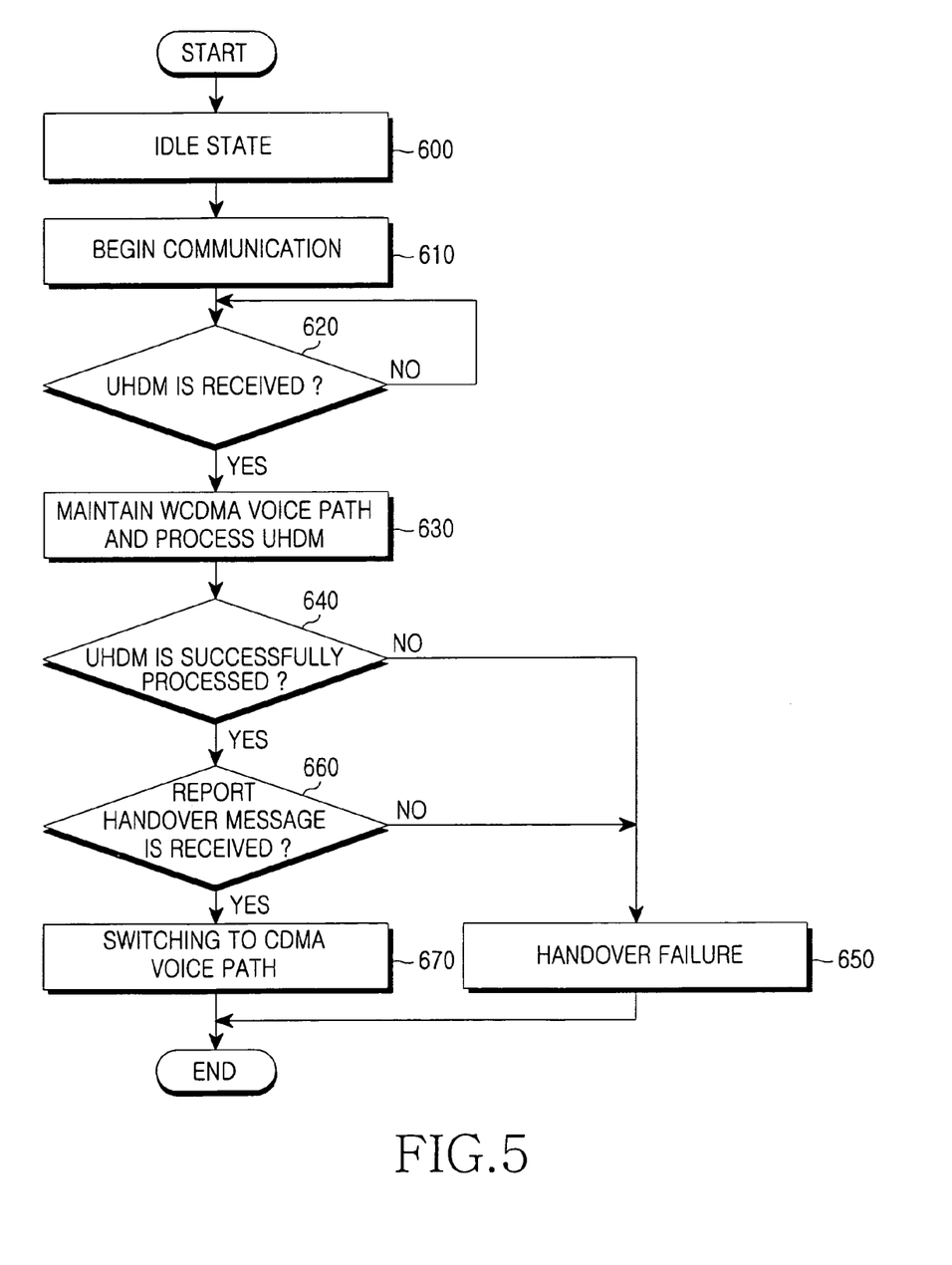
FIG. 5 is a flow diagram illustrating a control flow for minimizing a mute interval in a multimode terminal according to the present invention.

Hereinafter, a control flow for minimizing a mute interval in the multimode terminal, to which the present invention is applied, will be described with reference to FIG. 5.

First, in step 600, the terminal in a WCDMA mode stays in an idle state. When a user tries to make a call, the terminal begins communication after passing through processes for communication connection, in step 610. In step 620, the terminal during communication determines if an UHDM is received from a WCDMA base station to the WCDMA modem 450. That is, when the terminal in the WCDMA mode enters a boundary area between a WCDMA network and a CDMA network during communication, the terminal receives a handover from UTRAN command including the UHDM from the WCDMA base station.

After the handover from UTRAN command including the UHDM is received, the terminal processes the UHDM while maintaining the current WCDMA voice path, in step 630. In step 640, the terminal determines if the UHDM has been successfully processed. That is, the terminal determines if a process, such as acquisition of a handover-target communication network by means of the UHDM, has been successfully performed. If the UHDM has not been successfully processed, step 650 is performed. That is, the handover is regarded as a failure. However, the UHDM has been successfully processed, step 660 is performed. That is, the terminal, i.e. the WCDMA modem 450 maintains the WCDMA voice path until a report handover message, which reports the completion of the handover, is received from the CDMA modem 440. If the message is received, step 670 is performed, and the WCDMA voice path is switched to the CDMA voice path. However, if the message is not received, step 650 is performed, whereby the handover is regarded as a failure.

According to the present invention as described above, the switching of voice signals is accomplished at a time point nearest to the switching time point of the vocoder between the WCDMA system and the CDMA system. The mute interval occurring in handover can be minimized to time required only until an acknowledgment message for an HCM is received after the vocoder switching is actually accomplished in the system. Further, when the handover from UTRAN command has been received, the WCDMA voice path is not blocked but continuously maintained by means of a time gain according to the structure of a chip directly connected between the two modems. This is because the switching time point of the vocoder between the WCDMA system and the CDMA system is after the CDMA base station receives the HCM from the CDMA modem 440. Furthermore, since the modems are not connected through DPRAM switching, it is possible to maintain the WCDMA voice path even when the UHDM is processed.

According to the present invention as described above, when a multimode terminal, which supports both a CDMA and a WCDMA, performs a traffic handover, a voice path is so optimized as to be matched to the switching time of a vocoder between a WCDMA system and a CDMA system and switched, so that a mute interval inevitably occurring in handover between different communication networks can be reduced to an interval which is short to the extent that a user cannot detect it. Further, the present invention is applied, so that the mute interval can be significantly reduced by more than four times, as compared with a case in which the mute interval lasts an average of 0.9 seconds according to the prior art.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for minimizing a mute interval in a multimode terminal having a first modem and a second modem, which support different communication services, the method comprising:

starting a handover according to a Universal Mobile Telecommunications System Terrestrial Radio Access Network (UTRAN) command received through a first communication network;

determining if a handover in the second modem has been completed through a communication path directly interconnecting the first modem and the second modem while maintaining a voice path through the first modem if the handover starts;

transferring a Handover Completion Message (HCM) to a second communication network through the second modem, when the handover has been completed, receiving an acknowledgment message corresponding to the HCM through the second modem, reporting the acknowledgment message to the first modem, and switching a voice path through the first modem to a voice path through the second modem, thereby performing communication through the second communication network, wherein the first modem transmits a command directly to the second modem via the communication path.

2. The method as claimed in claim 1, wherein the step of starting the handover comprises:

extracting, by the first modem, a Universal Handover Direction Message (UHDM) from the handover from the UTRAN command received through the first communication network;

transferring the extracted message to the second modem through the communication path so that the second communication network can be acquired based on the extracted message; and processing the extracted message and performing acquisition of the second communication network.

3. The method as claimed in claim 1, wherein the voice path through the first modem is temporarily blocked when the second modem informs the second communication network of the handover completion, and is switched to the voice path through the second modem when a report for a handover completion is received from the second modem.

4. The method as claimed in claim 1, wherein the first communication network and the second communication network correspond to a CDMA network and a WCDMA network, respectively, and the first modem and the second modem process signals transmitted/received through the CDMA network and the WCDMA network, respectively.

5. The method as claimed in claim 1, wherein the first communication network and the second communication network correspond to a GSM network and a WCDMA network, respectively, and the first modem and the second modem process signals transmitted/received through the GSM network and the WCDMA network, respectively.

6. A multimode terminal for minimizing a mute interval, the multimode terminal having a first modem and a second modem, which support different communication services, the multimode terminal comprising:

the first modem for allowing the second modem to be in a traffic state according to a handover from a Universal Mobile Telecommunications System Terrestrial Radio Access Network (UTRAN) command received through a first communication network, determining if a handover in the second modem has been completed through a communication path directly interconnecting the first modem and the second modem, and switching a current voice path to a voice path through the second modem when the handover has been completed; and the second modem for transferring a Handover Completion Message (HCM) to a second communication network if the second modem is in the traffic state, receiving an acknowledgment message corresponding to the HCM, and reporting the handover completion to the first modem through the communication path, wherein the first modem transmits a command directly to the second modem via the communication path.

7. The multimode terminal as claimed in claim 6, wherein the first modem extracts a Universal Handover Direction Message (UHDM) from the handover from the UTRAN command received through the first communication network, and transfers the extracted message to the second modem through the communication path so that the second communication network can be acquired based on the extracted message.

8. The multimode terminal as claimed in claim 7, wherein the second modem processes the extracted message, attempts acquisition of the second communication network, performs communication initialization with the second communication network if the second communication network is acquired, determines that the handover has been completed if the communication initialization is completed, transfers the HCM to the second communication network.

9. The multimode terminal as claimed in claim 6, wherein, if the second modem transfers the HCM to the second communication network, the voice path through the first modem is temporarily blocked, and when a report for the handover completion is received from the second modem, the voice path through the first modem is switched to the voice path through the second modem.

10. The multimode terminal as claimed in claim 6, wherein the first communication network and the second communication network correspond to a CDMA network and a WCDMA network, respectively, and the first modem and the second modem process signals transmitted/received through the CDMA network and the WCDMA network, respectively.

11. The multimode terminal as claimed in claim 6, wherein the first communication network and the second communication network correspond to a GSM network and a WCDMA network, respectively, and the first modem and the second modem process signals transmitted/received through the GSM network and the WCDMA network, respectively.

* * * * *